Apr. 24, 1923.
N. M. HOPKINS
1,452,806
STORAGE BATTERY VENT
Filed May 31, 1921
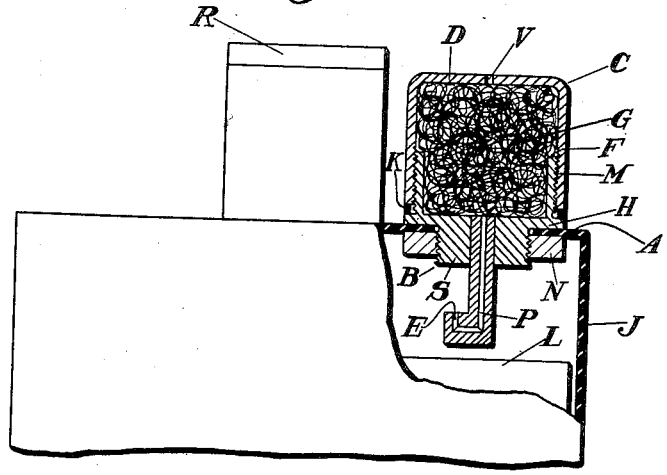
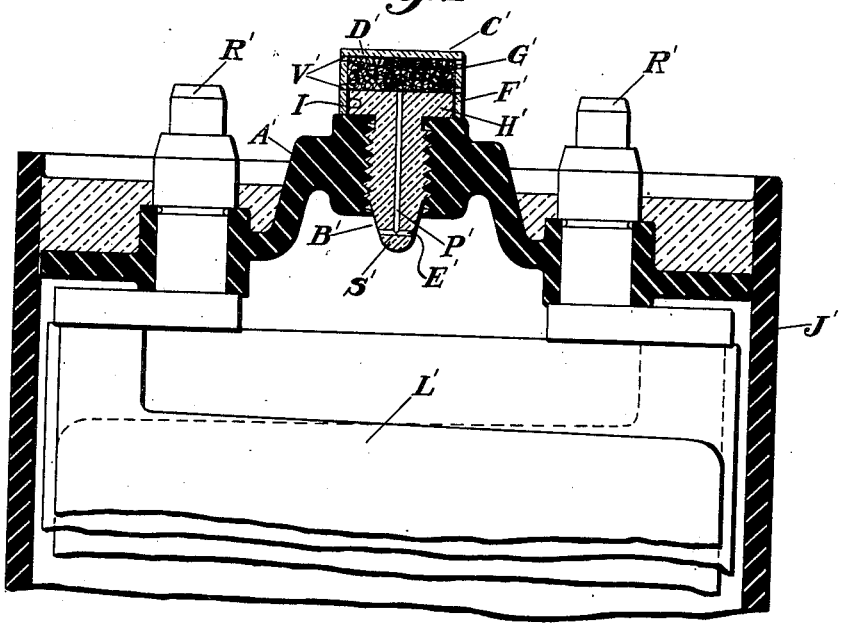
INVENTOR.
Nevil Monroe Hopkins
BY Byrnes Townsend Brickenstein
ATTORNEYS.

Patented Apr. 24, 1923.

1,452,806

UNITED STATES PATENT OFFICE.

NEVIL MONROE HOPKINS, OF NEW YORK, N. Y., ASSIGNOR TO NATIONAL CARBON CO. INC., A CORPORATION OF NEW YORK.

STORAGE-BATTERY VENT.

Application filed May 31, 1921. Serial No. 473,723.

*To all whom it may concern:*

Be it known that I, NEVIL MONROE HOPKINS, a citizen of the United States, residing at New York city, in the county of New York and State of New York, have invented certain new and useful Improvements in Storage-Battery Vents, of which the following is a specification.

This invention relates to storage battery vents and particularly to an improved non-spill vent adapted to prevent leakage of acid electrolyte from a storage battery.

When a storage battery cell is inverted or subjected to excessive vibration, drops of the electrolyte, such as sulphuric acid, may spill out through the gas escape passage. The principal object of the present invention is to provide a simple vent that has means for intercepting such electrolyte without interfering with the proper venting of the gases.

The above and other objects and the novel features of the invention will be apparent from the following description taken in connection with the accompanying drawings, in which—

Figs. 1 and 2 are partial views of storage batteries having this invention applied thereto.

Generally speaking, the objects of the invention are attained by providing, in the path of the escaping gases, a compartment to retain loose, chemically inert material that will not interfere with the escape of gas but will intercept acid electrolyte which may escape from the interior of the cell through the gas vent. An advantageous embodiment of the invention takes the form of an inverted cup-shaped cap that is secured to the outer end or head of the usual vent to form a chamber or compartment at the outer end of the gas vent for containing loose chemically inert material such as glass wool to intercept the acid but to allow the free escape of the gas. The entire vent is desirably made of non-corrodible material, that is, material which will not be attacked by the electrolyte. The invention is shown as applied to a storage battery adapted for flashlights and hand-lanterns and is also shown as applied to a storage battery used in motor cycles or airplanes, but it will be understood that the improvement is of general application.

As shown in Fig. 1 for example, the improved non-spill vent comprises a base B that has a head portion H to which the cap C is secured to form a compartment adapted to contain loose chemically inert material, such as the glass wool G. The base has a threaded stem S that projects through an opening of the cover A of the battery jar J and is secured in place, as by means of a nut N, to form an acid-tight joint. The stem has a small-bore gas passage P extending therethrough which has an entrance E that is not directly in the axis of the main portion of the gas passage so as to restrict leakage of electrolyte directly into the vent passage.

The outer end of the vent passage P opens into the compartment formed by the inverted cap C, which has a top D and depending skirt F. The cap may be provided with a vent, such as the vent V in the top D, and may also be secured to the head H of the base, as by the screw threads M. A washer K may be inserted between the cap and head to provide a tight joint.

The type of storage battery shown in Fig. 1 is one that is adapted for use in portable electric lighting devices such as hand-lanterns and flashlights and comprises suitable plates L in the jar J which are connected to terminals R projecting outside the jar. The invention may also be applied to advantage on other types of batteries which may be subjected to excessive vibration or which may be tipped or inverted, such as motor cycle and airplane batteries.

Fig. 2 illustrates a type of battery adapted for use on motor cycles, with the present invention applied thereto. In this construction the base B' of the improved vent has a small-bore gas escape passage P', the entrance E' of which is not directly in the axis of the main portion of the passage to retard the escape of electrolyte. The cap C' has a top part D' that is spaced from the head H' of the base so as to provide a chamber to retain the loose chemically inert material such as the glass wool G' that intercepts the acid electrolyte which enters and passes through the vent passage P'. The cap C', has a depending skirt F' that fits around the head H' of the base and may be secured thereto, as by a suitable cement I between the skirt and head. Suitable means may be provided for venting the gas from the chamber containing the glass wool, such as vents V' in the skirt portion F' of the cap. The base of the vent is provided with suitable screw threads whereby it may be coupled in a threaded opening in the cover A' of the cell jar J'. The battery may also be provided with the usual battery plates or elements L' and terminals R'.

While the improved vent is shown and described in detail it will be understood that the same may be modified without departing from the spirit of the invention or sacrificing any of its advantages.

I claim:

1. A storage battery vent comprising a base having threads whereby the same may be attached to a cell cover and also having a gas escape passage the entrance of which is not directly in the axis of the main portion of such passage, a vented cap secured to the end of said base opposite such entrance, and chemically inert loose material in said cap between the vent thereof and the outlet end of said gas escape passage.

2. The combination with a storage battery cell comprising a cover having a threaded vent plug opening, of a vent plug in said opening comprising a base having a threaded stem projecting into said opening and coupled to said cover, said base and stem having a small-bore gas passage therethrough the entrance of which is not directly in the axis of the main portion of such passage and which communicates with the space above the electrolyte, an inverted cup-shaped vented cap secured to said base outside said cover and having its top spaced from the base to form an outer compartment to receive escaping gas and electrolyte, and chemically inert material such as glass wool in said compartment through which said gas may pass but adapted to intercept electrolyte escaping through said passage.

In testimony whereof, I affix my signature.

NEVIL MONROE HOPKINS.